(12) United States Patent
Arao

(10) Patent No.: US 11,927,812 B2
(45) Date of Patent: Mar. 12, 2024

(54) FERRULE AND OPTICAL CONNECTOR

(71) Applicant: SUMITOMO ELECTRIC INDUSTRIES, LTD., Osaka (JP)

(72) Inventor: Hajime Arao, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 321 days.

(21) Appl. No.: 17/423,730

(22) PCT Filed: Feb. 19, 2020

(86) PCT No.: PCT/JP2020/006610
§ 371 (c)(1),
(2) Date: Jul. 16, 2021

(87) PCT Pub. No.: WO2020/175288
PCT Pub. Date: Sep. 3, 2020

(65) Prior Publication Data
US 2022/0026645 A1 Jan. 27, 2022

(30) Foreign Application Priority Data
Feb. 25, 2019 (JP) .................. 2019-031976

(51) Int. Cl.
*G02B 6/38* (2006.01)
*G02B 6/36* (2006.01)

(52) U.S. Cl.
CPC ......... *G02B 6/3885* (2013.01); *G02B 6/3644* (2013.01); *G02B 6/381* (2013.01); *G02B 6/3882* (2013.01)

(58) Field of Classification Search
CPC ..... G02B 6/3882; G02B 6/381; G02B 6/3644
See application file for complete search history.

(56) References Cited

U.S. PATENT DOCUMENTS

2001/0036342 A1* 11/2001 Knecht ............... G02B 6/3834
385/84
2012/0093462 A1 4/2012 Childers et al.
(Continued)

FOREIGN PATENT DOCUMENTS

| JP | 2003-066280 A | 3/2003 |
| JP | 2006-084498 A | 3/2006 |

(Continued)

OTHER PUBLICATIONS

Masaki Ohmura et al., "High-Precision 32 Mechanically Transferable Ferrule for Single-Mode Fiber", SEI Technical Review, Jan. 2016, No. 188, p. 89-p. 93.

*Primary Examiner* — Sung H Pak
(74) *Attorney, Agent, or Firm* — Oliff PLC

(57) ABSTRACT

A ferrule according to an embodiment is a ferrule of an optical connector to which a counterpart connector is connected. The ferrule includes an end portion having an optical fiber retention hole and a guide hole opened, the optical fiber retention hole into and on which a fiber is inserted and retained, the guide hole into which a guide pin is inserted, the guide pin establishing positioning to the counterpart connector. The end portion includes an optical surface including an opening of the optical fiber retention hole, a guide hole exposure surface including an opening of the guide hole, and a step part formed between the optical surface and the guide hole exposure surface.

2 Claims, 9 Drawing Sheets

(56) References Cited

U.S. PATENT DOCUMENTS

| | | |
|---|---|---|
| 2015/0043869 A1 | 2/2015 | Kuo |
| 2017/0031106 A1 | 2/2017 | Takano et al. |
| 2018/0321446 A1 | 11/2018 | Arao et al. |

FOREIGN PATENT DOCUMENTS

| | | |
|---|---|---|
| JP | 6462833 B1 | 1/2019 |
| WO | 2017/073408 A1 | 5/2017 |
| WO | 2018/037960 A1 | 3/2018 |

* cited by examiner

FERRULE AND OPTICAL CONNECTOR

TECHNICAL FIELD

An aspect of the present disclosure relates to a ferrule and an optical connector.

The present application claims the benefit of priority based upon Japanese Patent Application No. 2019-031976 filed on Feb. 25, 2019, the entire contents of which are incorporated by reference herein.

BACKGROUND ART

Non Patent Literature 1 describes an MT ferrule including 32 optical fiber retention holes into and on which optical fibers are individually inserted and retained and two guide holes into which positioning guide pins are individually inserted. This MT ferrule is housed in an MPO housing, and an MPO connector is assembled. A pair of the MPO connectors is inserted into the inside of an adapter to bring the MT ferrules into physical contact (PC) connection, and thus optical coupling between the pair of the MPO connectors is achieved.

Patent Literature 1 describes an optical connector and an optical connection structure. The optical connector includes a plurality of optical fibers, a ferrule that collectively retains the plurality of optical fibers, and a spacer that is provided on the ferrule end face of the ferrule and that defines the spacing to a counterpart connector. The spacer is in a plate shape with an opening. From the opening of the spacer, the tip end faces of the optical fibers are exposed. The spacer lies between the optical connector and the counterpart connector, and thus a spatial join between the optical connector and the counterpart connector is achieved.

Patent Literature 2 describes a ferrule including a front end connected to a counterpart connector, a back end located on the opposite side of the counterpart connector, and a middle portion connecting the front end to the back end. The front end is in a rectangular shape. On the front end, a pair of guide holes into which positioning guide pins are individually inserted is opened. In the inside of the ferrule, a plurality of optical fiber retention hole is formed into and on which a plurality of optical fibers is individually inserted and retained. The pair of guide holes is disposed such that the guide holes are arranged along the long-side direction of the front end in a rectangular shape. Between the pair of guide holes, a recess recessed from the front end is formed. From the bottom surface of the recess, a plurality of lenses is exposed, which is individually optically coupled to the plurality of optical fibers. This ferrule forms a lens connector that performs non-contact type spatial join in which the plurality of lenses is not brought into contact with the counterpart connector when the front end is brought into contact with the counterpart connector.

Patent Literature 3 describes an MT ferrule having a guide hole into which a positioning guide pin is inserted. The cross sectional form of the guide hole when the guide hole is cut along a plane orthogonal to an optical axis is in a noncircular shape. The guide hole has a plurality of recesses recessed on the outer side in the radial direction, the plurality of recesses extending in the direction of the optical axis. When the guide pin is inserted into this guide hole, dust enters the recess.

CITATION LIST

Patent Literature

Patent Literature 1: International Unexamined Patent Publication WO 2017/073408

Patent Literature 2: US Unexamined Patent Publication No. 2012/0093462

Patent Literature 3: US Unexamined Patent Publication No. 2017/0031106

Non Patent Literature

Non Patent Literature 1: SEI TECHNICAL REVIEW No. 188 "High-Precision 32 Mechanically Transferable Ferrule for Single-Mode Fiber"

SUMMARY OF INVENTION

A ferrule according to an embodiment is a ferrule of an optical connector to which a counterpart connector is connected. The ferrule includes an end portion having an optical fiber retention hole and a guide hole opened from the end portion, the optical fiber retention hole into and on which an optical fiber is inserted and retained, the guide hole into which a guide pin is inserted, the guide pin establishing positioning to the counterpart connector. The end portion includes an optical surface including an opening of the optical fiber retention hole, a guide hole exposure surface including an opening of the guide hole, and a step part formed between the optical surface and the guide hole exposure surface.

DESCRIPTION OF EMBODIMENTS

Figure 1:
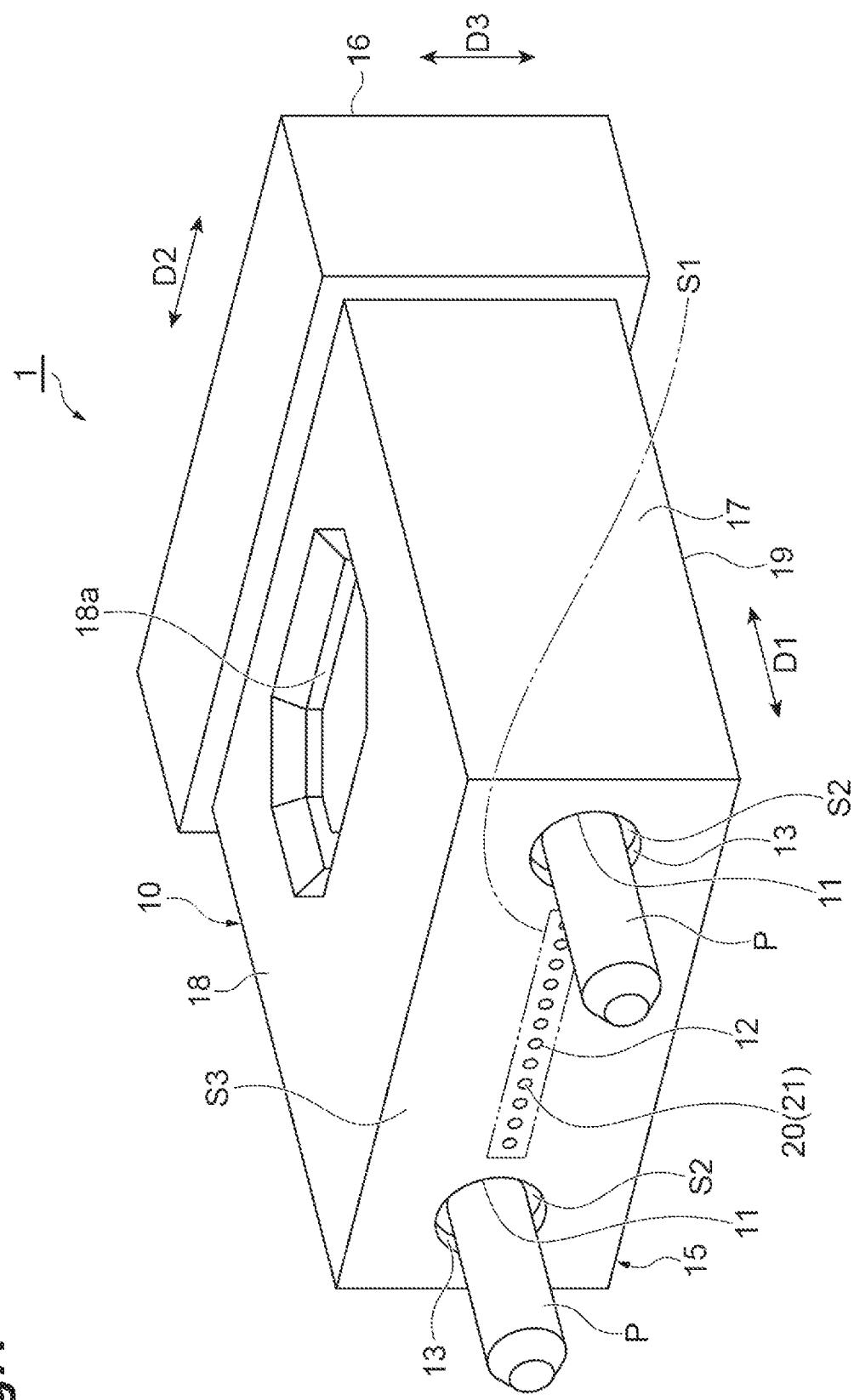
FIG. 1 is a perspective view showing a ferrule and a guide pin according to the first embodiment.

Problem to be Solved by Present Disclosure

Meanwhile, the above-described ferrule in which the guide pin is inserted into the guide hole, dust is sometimes attached to the base of the guide pin. When dust is attached to the base of the guide pin, dust is caught between the ferrule and the counterpart connector to produce an inclination between the ferrule and the counterpart connector. This inclination raises concerns that the connection quality of optical coupling is degraded. For example, in the above-described PC connection, PC decoupling is sometimes produced due to the above inclination. In the above-described lens connector, there are circumstances that the lens connector is vulnerable to a tilt associated with the inclination because a beam is expanded between the lenses.

In the above-described optical connector provided with the spacer having the opening, the opening is in a frame shape. Therefore, when dust enters the inner side of the opening, there is a possibility that the removal of dust having entered becomes difficult. Moreover, when dust enters the inner side of the opening, there is a possibility of blocking the optical path of light emitted from the optical surface from which the tip end face of the optical fiber is exposed. In the above-described MT ferrule having the guide hole in a noncircular shape, the preparation of the recess recessed on the outer side in the radial direction possibly becomes difficult.

Typically, the guide hole is prepared by inserting a core pin into a molten resin for shaping. In the case in which a recess is formed in a guide hole, the shape of the core pin has to be formed in a special shape. Therefore, for example, it is difficult to form a recess in a unit of sub micron. From the description above, a possibility that dust enters the optical surface still remains in establishing connection to the counterpart connector, and thus the reliable suppression of the entry of dust into the optical surface is desired.

It is an object of the present disclosure to provide a ferrule and an optical connector that enable the reliable suppression of the entry of dust into an optical surface.

Advantageous Effects of Present Disclosure

According to the present disclosure, the reliable suppression of the entry of dust into the optical surface is enabled.

DESCRIPTION OF EMBODIMENTS OF PRESENT DISCLOSURE

First, the contents of embodiments of the present disclosure will be described in enumeration. A ferrule according to an embodiment is a ferrule of an optical connector to which a counterpart connector is connected. The ferrule includes an end portion having an optical fiber retention hole and a guide hole opened from the end portion, the optical fiber retention hole into and on which an optical fiber is inserted and retained, the guide hole into which a guide pin is inserted, the guide pin establishing positioning to the counterpart connector. The end portion includes an optical surface including an opening of the optical fiber retention hole, a guide hole exposure surface including an opening of the guide hole, and a step part formed between the optical surface and the guide hole exposure surface.

An optical connector according to an embodiment includes the above-described ferrule, and an optical fiber inserted into and retained on the optical fiber retention hole of the ferrule.

The ferrule and the optical connector includes the end portion having the optical fiber retention hole and the guide hole opened from the end portion, the optical fiber retention hole into and on which the optical fiber is inserted and retained, the guide hole into which the guide pin is inserted. The end portion is formed with the optical surface including the opening of the optical fiber retention hole and the guide hole exposure surface including the opening of the guide hole, and the step part is formed between the optical surface and the guide hole exposure surface. Even though dust is attached to the base of the guide pin, the step part suppresses the entry of dust from the guide hole exposure surface into the optical surface. Accordingly, a reduction in a possibility that blocks the optical path of light emitted from the optical surface is enabled, and thus suppressing degradation in the connection quality of optical coupling is enabled. In the ferrule and the optical connector, the step part surpasses the entry of dust into the optical surface, and thus the shape of the guide hole does not have to be formed in special shapes such as a noncircular shape. From the description above, highly accurate shaping of the shape of the guide hole is enabled, and the reliable suppression of the entry of dust into the optical surface is enabled.

The guide hole exposure surface may be a bottom surface of a recess recessed in the optical surface. In this case, the optical surface protrudes to the guide hole exposure surface, and thus dust is accommodated in the guide hole exposure surface that is the bottom surface of the recess. Accordingly, the reliable suppression of the entry of dust from the guide hole exposure surface that is the bottom surface of the recess into the optical surface is enabled.

The step part may be a projection protruding to the optical surface. In this case, the projection is formed between the guide hole exposure surface and the optical surface, and thus the projection enables blocking the entry of dust into the optical surface.

The above-described ferrule may have a configuration in which a shape of a boundary part of the guide hole exposure surface viewed from a connection direction in which the counterpart connector is connected is in a curved shape or in a linear shape, a width of the guide hole exposure surface is 150 μm or more, and a depth of the guide hole exposure surface is 150 μm or more. Meanwhile, the size of dust that possibly enters between the optical connector and the counterpart connector is approximately 150 μm at the maximum. Accordingly, as long as the width and the depth of the guide hole exposure surface is 150 μm or more, the more reliable suppression of dust stepping across the step part is enabled. Consequently, the more reliable suppression of the entry of dust into the optical surface is enabled.

At least a part of the above-described guide hole exposure surface may be opened in establishing connection to the counterpart connector. In this case, at least a part of the guide hole exposure surface form an opened space in establishing connection to the counterpart connector, and thus a further reduction in a possibility that dust is caught between the ferrule and the counterpart connector is enabled. Accordingly, suppressing the entry of dust into the optical surface is achieved, and suppressing the accumulation of dust at the end portion of the ferrule is enabled.

DESCRIPTION OF EMBODIMENTS OF PRESENT DISCLOSURE

In the following, specific examples of ferrules and optical connectors according to embodiments will be described with reference to the drawings. The present invention is not limited to specific examples below, and intended to include all modifications shown in the scope of claims and equivalent to the scope of claims. In the description of the drawings, components the same or equivalent are designated with the same reference signs, and the duplicate description is appropriately omitted. For easy understanding, a part of the drawings is sometimes simplified or exaggerated, and dimensions, ratios, and any other parameters are not limited to those described in the drawings.

First Embodiment

Figure 2:
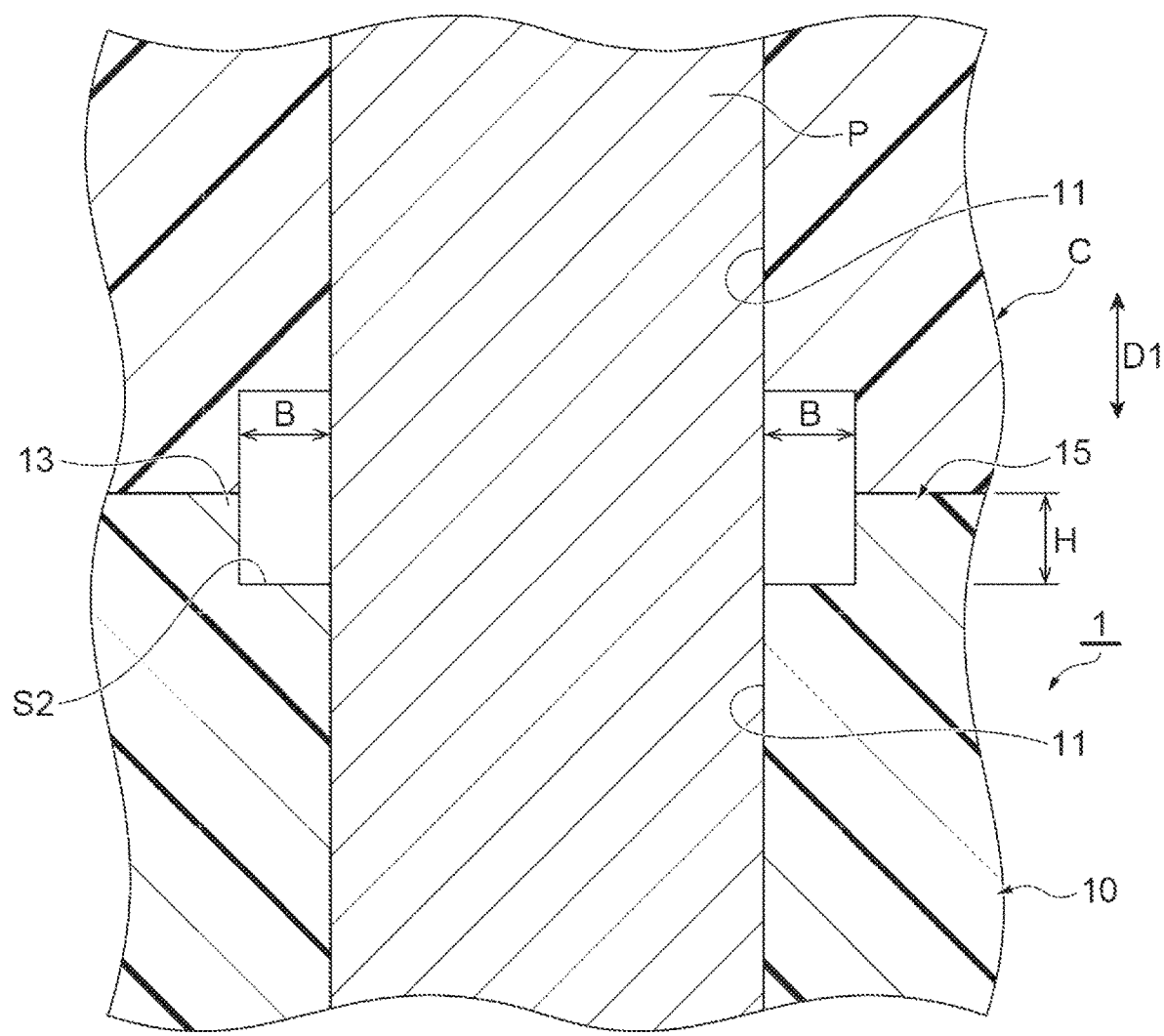
FIG. 2 is a long-side sectional view of the guide pin and a step part in FIG. 1.

FIG. 1 is a perspective view showing an optical connector 1 including a ferrule 10 according to a first embodiment. FIG. 2 is a cross sectional view showing a guide pin P inserted into a guide hole 11 the ferrule 10 in FIG. 1 and structures around the guide pin P. As shown in FIGS. 1 and 2, the optical connector 1 is connected to a counterpart connector C, for example, along a direction D1. The counterpart connector C may be the same as the optical connector 1, or may be an optical connector different from the optical connector 1.

The optical connector 1 includes a ferrule 10 and an optical fiber 20. For example, the contact surface (e.g. a contact surface S3, described later) of the optical connector 1 is brought into contact with the contact surface of the counterpart connector C. The guide pin P is inserted into the guide hole 11 of the optical connector 1 and a guide hole 11 of the counterpart connector C, and thus the relative position between the optical connector 1 and the counterpart connector C is positioned.

The ferrule 10 is an MT ferrule, for example. The ferrule 10 is formed including glass filler contained in polyphenylene sulfide (PPS). The principal component of the material of the ferrule 10 is PPS. The ferrule 10 includes an end portion 15 provided at one end in the connection direction D1 and brought into contact with the counterpart connector C, a rear end portion 16 provided at the other end in the connection direction D1, and a side portion 17, an upper portion 18, and a lower portion 19, which extend along the connection direction D1.

A pair of the side portions 17 is disposed side by side along a direction D2 intersecting with the connection direction D1. The upper portion 18 and the lower portion 19 are disposed side by side along a direction D3 intersecting with both of the connection direction D1 and the direction D2. The direction D2 is the long-side direction of the end portion 15 in a rectangular shape, for example, and the direction D3 is the width direction of the end portion 15. The connection direction D1, the direction D2, and the direction D3 are orthogonal to each other, for example.

The upper portion 18 is formed with a window hole 18a from which the optical fibers 20 in the inside of the ferrule 10 can be visually recognized. The window hole 18a is an introduction hole for an adhesive that adheres and fixes the optical fibers 20 in the inside of the ferrule 10. Therefore, the adhesive is introduced from the window hole 18a into the inside of the ferrule 10 in a state in which the optical fibers 20 are disposed in the inside of the ferrule 10, and thus the optical fibers 20 are adhered in the inside of the ferrule 10.

The ferrule 10 has the guide hole 11 into which the guide pin P is inserted and a plurality of optical fiber retention holes 12 into which the optical fibers 20 are individually inserted and on which the optical fibers 20 are retained. As an example, the ferrule 10 is a 12-core ferrule having 12 optical fiber retention holes 12 arranged along the direction D2. The guide holes 11 and the optical fiber retention holes 12 are both opened on the end portion 15 of the ferrule 10.

The guide hole 11 is in a cylindrical hole shape, for example, and is not in a special shape. The guide holes 11 and the optical fiber retention hole 12 are opened in both of the end portion 15 and the rear end portion 16 of the ferrule 10, and extend along the connection direction D1 in the inside of the ferrule 10. A plurality of guide holes 11 and the plurality of optical fiber retention holes 12 are disposed so as to rearranged along the direction D2. The ferrule 10 has a pair of guide holes 11. The pair of guide holes 11 are disposed on the two end sides of the plurality of optical fiber retention holes 12 in the direction D2.

From the end portion 15, a tip end face 21 of the optical fiber 20 is exposed. The ferrule 10 has the plurality of optical fiber retention holes 12 arranged along the direction D2. The plurality of optical fibers 20 is individually inserted into the plurality of optical fiber retention holes 12, and retained. The optical fiber 20 is a single-mode fiber having a core and a cladding, for example. The center axis direction of each of the optical fiber retention holes 12 and the optical axis direction of the optical fiber 20 are matched with the connection direction D1, for example.

The end portion 15 has an optical surface S1 including the openings of the optical fiber retention holes 12, a guide hole exposure surface S2 including the openings of the guide holes 11, and a contact surface S3 that is a portion other than the optical surface S1 and the guide hole exposure surface S2 and that is brought into contact with the counterpart connector C. The optical surface S1 is in an oblong rectangular shape, for example, on the end portion 15. The optical surface S1 is located in the center in the direction D3 on the end portion 15. The guide hole exposure surface S2 is provided at two places, for example, on the end portion 15, and in a ring shape surrounding the opening of the guide hole 11. The contact surface S3 is provided on the outer side of the optical surface S1 and the guide hole exposure surface S2, for example, on the end portion 15, and in a frame shape surrounding the optical surface S1 and the guide hole exposure surface S2.

Figure 3:
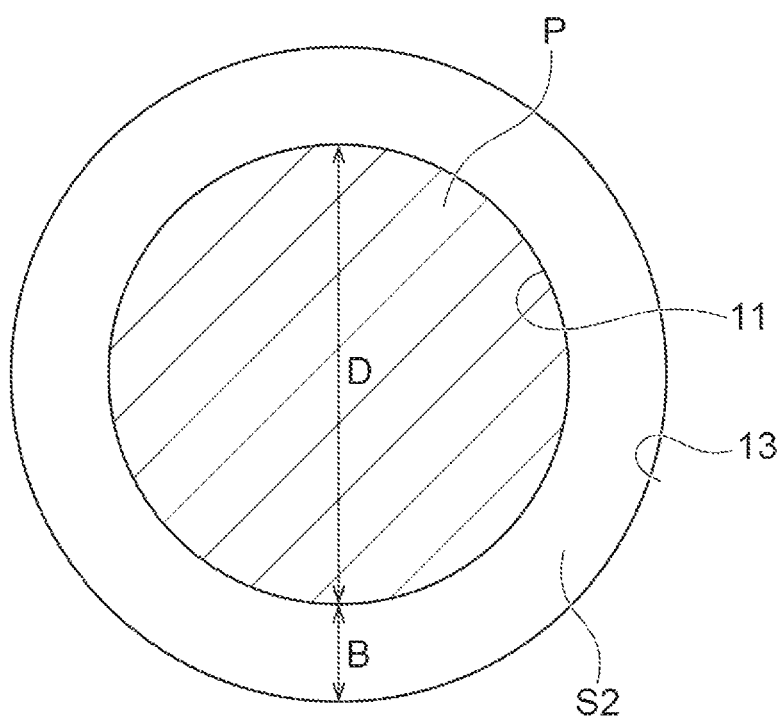
FIG. 3 is a view of the cross section of the guide pin and the step part in FIG. 1.

FIG. 3 is a cross sectional view of the guide pin P showing the guide pin P and the guide hole exposure surface S2. As shown in FIGS. 2 and 3, the guide hole exposure surface S2 is in an annular ring shape, for example, surrounding the guide hole 11. That is, the shape of the boundary part of the guide hole exposure surface S2 to the contact surface S3 viewed from the connection direction D1 is in an annular ring shape (in a curved shape). Between the guide hole exposure surface S2 and the optical surface S1, a step part 13 is formed, and the guide hole exposure surface S2 is a recess recessed in the step part 13.

Meanwhile, in the case in which the guide hole exposure surface S2 in a hollow shape is not provided, there is a possibility that dust enters between the optical connector 1 and the counterpart connector C in the insertion of the guide pin P into the guide hole 11. When dust enters between the optical connector 1 and the counterpart connector C to form a gap between the optical connector 1 and the counterpart connector C, there is a possibility that influences is exerted over the optical coupling of the optical connector 1 to the counterpart connector C. Therefore, even in the case in which dust enters between the optical connector 1 and the counterpart connector C, suppressing the forming a gap between the optical connector 1 and the counterpart connector C is desired.

For example, the guide hole exposure surface S2 is a portion that houses dust. The step part 13 is a part that suppresses the entry of dust from the guide hole exposure surface S2 into the optical surface S1. That is, dust is accommodated into the guide hole exposure surface S2 that is a recess recessed on the inner side of the step part 13, and thus the entry of dust into the optical surface S1 is suppressed. Moreover, even though dust enters between the optical connector 1 and the counterpart connector C, dust is accommodated into the guide hole exposure surface S2 in a hollow shape, and thus suppressing the forming a gap between the optical connector 1 and the counterpart connector C is enabled.

A diameter D of the guide pin P is 0.547 mm or more and 0.699 mm or less, for example. However, the diameter D is appropriately changeable. For example, the guide hole exposure surface S2 is in a concentric circle with the guide pin P when viewed from the connection direction D1. A width B of the guide hole exposure surface S2 corresponds to the distance between the boundary parts of the guide hole exposure surface S2, for example. A depth H of the guide hole exposure surface S2 corresponds to the depth from the contact surface S3 to the bottom surface of the recess of the guide hole exposure surface S2. The width B of the guide hole exposure surface S2 having the boundary part to the contact surface S3 in an annular ring shape (in a curved shape) is 150 μm or more, for example. The upper limit of the width B is the extent that the guide hole exposure surface S2 does not reach the optical surface S1. The depth H of the guide hole exposure surface S2 in the connection direction D1 on the step part 13 is 150 μm or more.

Meanwhile, dust used in "TIA/EIA-455-35-AFOTP-35—Fiber Optic Component Dust (Fine Sand) Test", which is the cabling standard of the optical connector, is required to pass the 100-mesh screen at 100%. The 100-mesh-screen has meshes in a lattice shape with a 150 μm edge. Accordingly, as described above, when the width B and the depth H of the guide hole exposure surface S2 that accommodates dust are both 150 μm or more, dust is further reliably accommodated into the guide hole exposure surface S2, and thus suppressing the forming of a gap due to dust between the optical connector 1 and the counterpart connector C is enabled.

Next, the operation and effect of the optical connector 1 and the ferrule 10 described above according to the embodiment will be described in detail. The optical connector 1 and the ferrule 10 include the end portion 15 having the optical fiber retention holes 12 and the guide holes 11 opened from the end portion 15, the optical fiber retention holes 12 into and on which the optical fibers 20 are individually inserted and retained, the guide holes 11 into which the guide pins P are individually inserted. The end portion 15 is formed with the optical surface S1 including the openings of the optical fiber retention holes 12 and the guide hole exposure surface S2 including the openings of the guide holes 11. The step part 13 is formed between the optical surface S1 and the guide hole exposure surface S2. Even though dust is attached to the base of the guide pin P, the step part 13 suppresses the entry of dust from the guide hole exposure surface S2 into the optical surface S1.

Accordingly, a reduction in a possibility that blocks the optical path of light emitted from the optical surface S1 is enabled, and thus suppressing degradation in the connection quality of optical coupling is enabled. The ferrule 10 and the optical connector 1 suppress the entry of dust into the optical surface S1 using the step part 13, and thus the shape of the guide hole 11 does not have to be in a special shape such as a noncircular shape. In the present embodiment, the guide hole exposure surface S2 in a ring shape surrounding the guide hole 11 only has to be formed around the guide hole 11. From the description above, the highly accurate forming of the shape of the guide hole 11 is enabled, and the reliable suppression of the entry of dust into the optical surface S1 is enabled.

In the present embodiment, the guide hole exposure surface S2 is the bottom surface of the recess recessed in the connection direction D1 to the optical surface S1. Therefore, the optical surface S1 protrudes in the connection direction D1 to the guide hole exposure surface S2, and thus dust is accommodated into the guide hole exposure surface S2 that is the bottom surface of the recess. Accordingly, suppressing the entry of dust from the guide hole exposure surface S2 that is the bottom surface of the recess into the optical surface S1 is enabled.

In the ferrule 10 according to the present embodiment, the shape of the boundary part of the guide hole exposure surface S2 to the contact surface S3 viewed from the connection direction D1 is in a curved shape, the width B of the guide hole exposure surface S2 is 150 μm or more, and the depth H of the guide hole exposure surface S2 is 150 μm or more. As described above, the size of dust that possibly enters between the optical connector 1 and the counterpart connector C is approximately 150 μm at the maximum. Accordingly, when the width B and the depth H of the guide hole exposure surface S2 are 150 μm or more, the more reliable suppression of dust stepping across the step part 13 is enabled. Consequently, the more reliable suppression of the entry of dust into the optical surface S1 is enabled.

Second Embodiment

Figure 4:
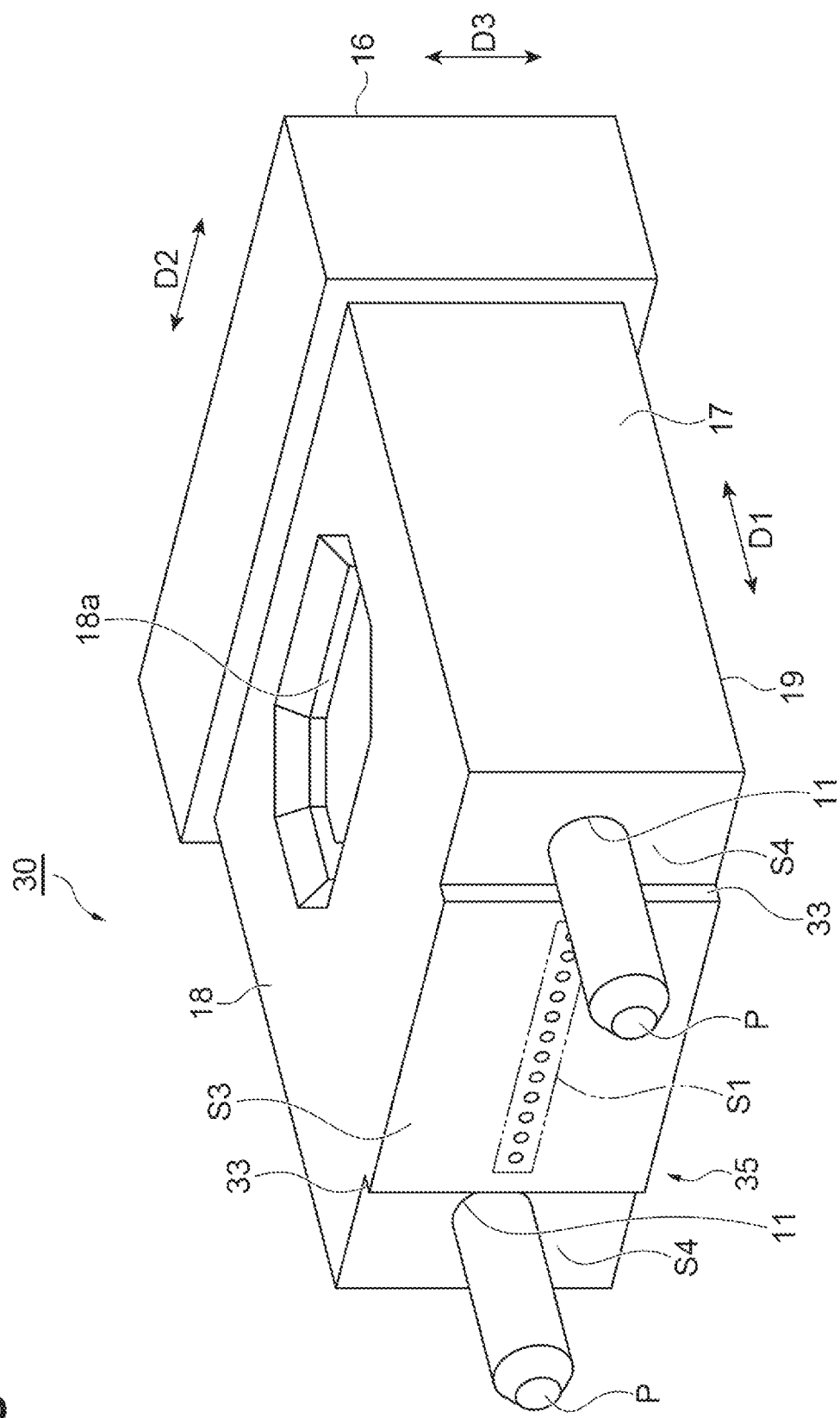
FIG. 4 is a perspective view showing a ferrule and guide pins according to a second embodiment.

Next, a ferrule 30 according to a second embodiment will be described with reference to FIG. 4. As shown in FIG. 4, the ferrule 30 according to the second embodiment includes an end portion 35 different from the above-described end portion 15. In the following description, in order to avoid duplication, and the description the same as the above-described embodiment is appropriately omitted.

As shown in FIG. 4, the end portion 35 has a guide hole exposure surface S4 including the opening of a guide hole 11, and is formed with a pair of guide hole exposure surfaces S4 arranged along the direction D2. The guide hole exposure surface S4 is a recess recessed in the connection direction D1 to an optical surface S1. The guide hole exposure surface S4 is provided at both ends of the end portion 35 in the direction D2, for example. The guide hole exposure surface S4 is in a rectangular shape (the boundary part to the contact surface S3 is in a linear shape) extending in both of the direction D2 and the direction D3, for example, and extending to the end in the direction D2 in the front surface of the ferrule 30. The contact surface S3 is provided on each of the two end sides of the optical surface S1 in the direction D3. In establishing connection to a counterpart connector C, the counterpart connector C is brought into contact with the optical surface S1 and the contact surface S3, and is not brought into contact with the guide hole exposure surface S4. That is, when the counterpart connector C is brought into contact with the optical surface S1 and the contact surface S3, an open space is formed on the two end sides of the guide hole exposure surface S4 in the direction D2 and in the direction D3 side. The open space is formed among the guide hole exposure surface S4, a step part 33, and the counterpart connector C.

The step part 33 is formed between the guide hole exposure surface S4 and the optical surface S1. The pair of step parts 33 is disposed so as to be arranged along the direction D2. The guide hole exposure surface S4 is the bottom surface of the recess recessed in the connection direction D1 on the step part 33. The step parts 33 extend from one end of the end portion 35 in the direction D3 to the other end. The step part 33 is a part that blocks the entry of dust from the guide hole exposure surface S4 to the center side (the optical surface S1 side and the contact surface S3 side) in the direction D2 and that is capable of ejecting dust onto the two end sides in the direction D2 by cleaning, for example.

As described above, the ferrule 30 according to the second embodiment includes the end portion 35 formed with the guide hole exposure surface S4 and the step part 33 is formed, and the step part 33 suppresses the entry of dust from the guide hole exposure surface S4 into the optical surface S1. Accordingly, the effect similar to the first embodiment is obtained. At least a part of the guide hole exposure surface S4 (on the two end sides in the direction D2 and the direction D3 side) forms an open space in establishing connection to the counterpart connector C.

Therefore, a part of the guide hole exposure surface S4 is the open space in establishing connection to the counterpart connector C at least, and thus a further reduction in a possibility that dust is caught between the ferrule 30 and the counterpart connector C is enabled. Accordingly, suppressing the entry of dust into the optical surface S1 is achieved, and suppressing the accumulation of duct at the end portion 35 of the ferrule 30 is enabled.

Third Embodiment

Figure 5:
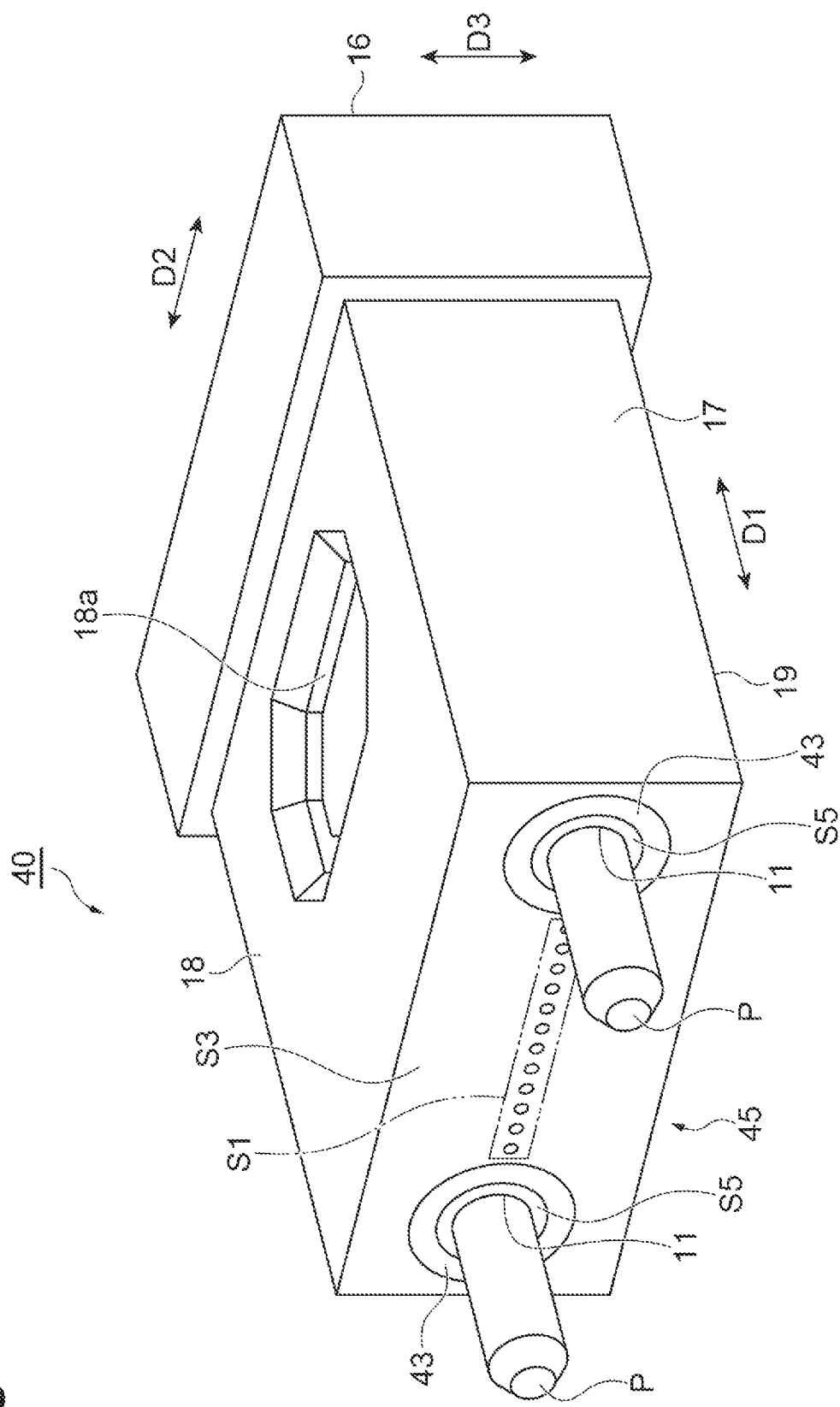
FIG. 5 is a perspective view showing a ferrule and guide pins according to a third embodiment.
Figure 6:
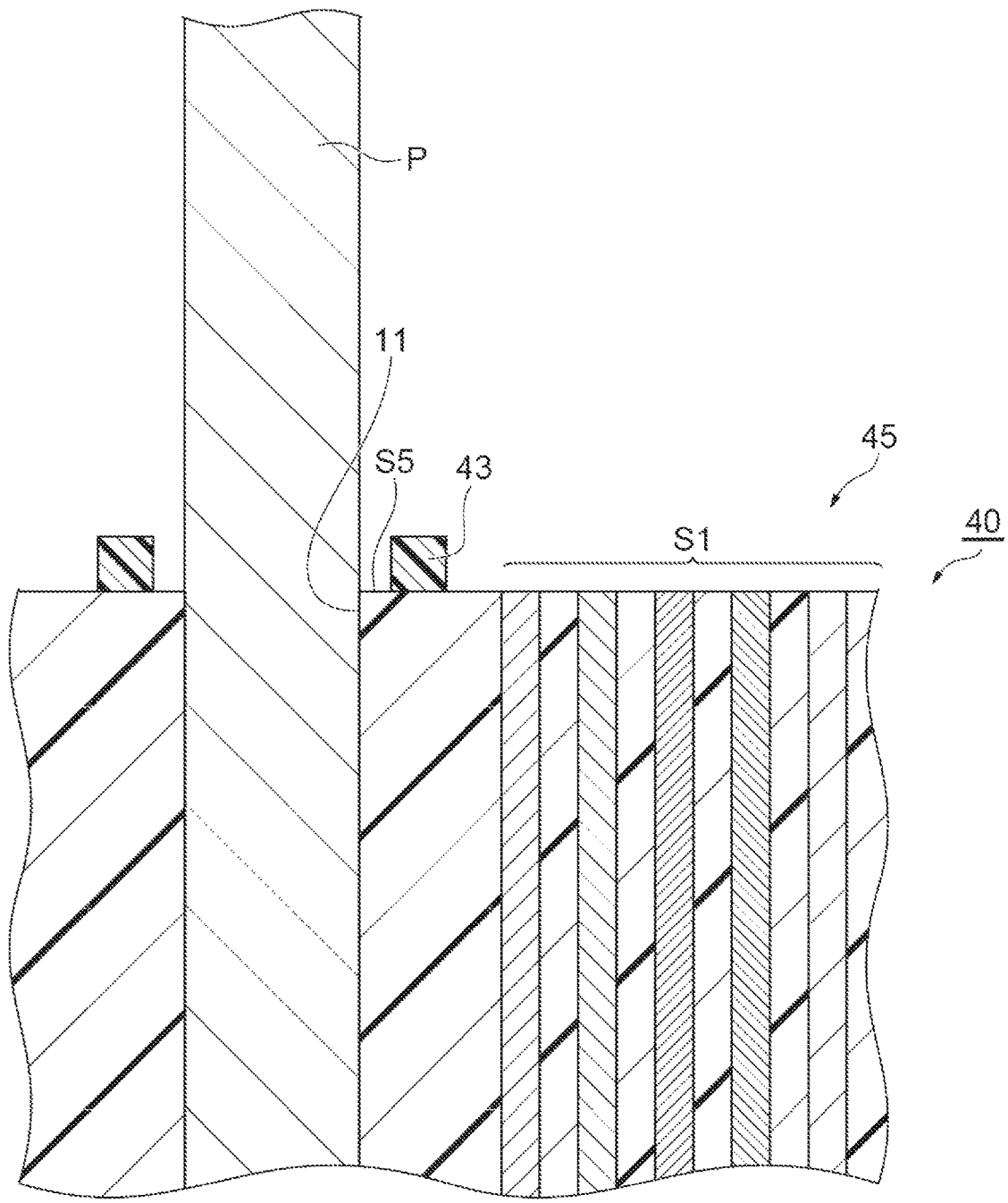
FIG. 6 is a long-side sectional view showing the guide pin, a step part, and an optical surface in FIG. 5.

Next, a ferrule 40 according to a third embodiment will be described with reference to FIGS. 5 and 6. As shown in FIGS. 5 and 6, the ferrule 40 is different from the above-described embodiments in that an end portion 45 with no guide hole exposure surface in a hollow shape. The end portion 45 has an optical surface S1, a guide hole exposure surface S5 including the openings of guide holes 11, and a step part 43 provided between the optical surface S1 and the guide hole exposure surface S5. For example, the height of the guide hole exposure surface S5 is the same as the height of the optical surface S1. The step part 43 is a projection protruding to the optical surface S1.

The step part 43 is a film in a ring shape adhered to the ferrule 40, for example. That is, in the third embodiment, the step part 43 that is a film is pasted by adhesion. Here, adhesion may be not only joining using an adhesive but also may be mechanical adhesion, chemical adhesion, dispersion adhesion, electrostatic adhesion, or welding. As an example, the step part 43 is in an annular ring shape, and is pasted to the position surrounding the guide hole 11 at the end portion 45. The material of the step part 43 may be the same as the material of the ferrule 40, for example. The material of the step part 43 may be PPS. The step part 43 may be pasted after polishing the optical surface S1. In this case, the avoidance of a problem that the step part 43 peels off by polishing is enabled. Note that the step part 43 may be a step part formed by resin molding of the ferrule 40.

As described above, the ferrule 40 according to the third embodiment includes the end portion 45 formed with the guide hole exposure surface S5 and the step part 43, and the step part 43 suppresses the entry of dust from the guide hole exposure surface S5 into the optical surface S1. Accordingly, the effects similar to the above-described embodiments are obtained. The projection (the step part 43) is formed between the guide hole exposure surface S5 and the optical surface S1, and thus the projection enables blocking the entry of dust into the optical surface S1. Moreover, the ferrule 40 includes the step part 43 in a projection shape, and thus the use of a typical MT ferrule is enabled as the ferrule 40.

Fourth Embodiment

Figure 7:
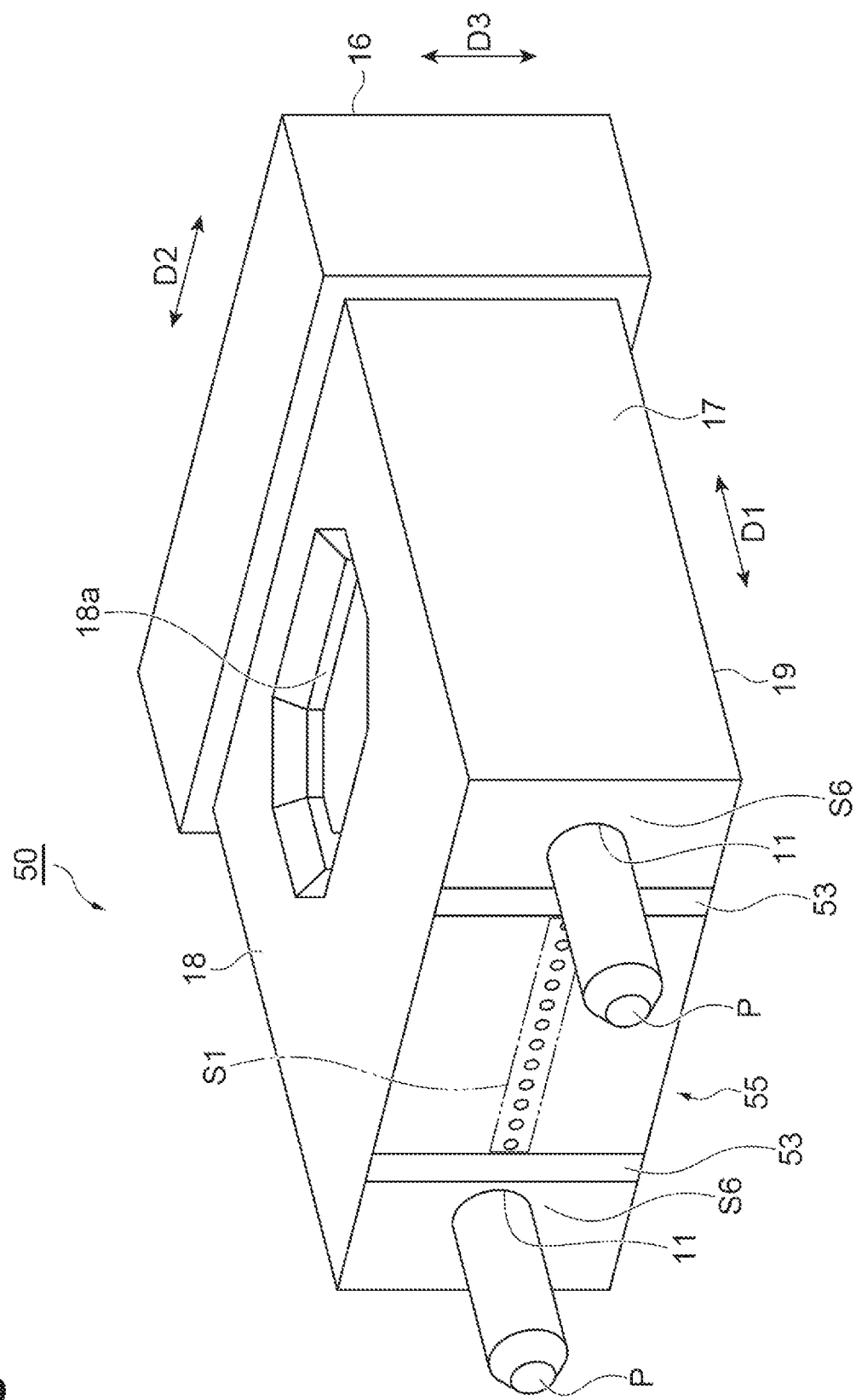
FIG. 7 is a perspective view showing a ferrule and guide pins according to a fourth embodiment.

Next, a ferrule 50 according to a fourth embodiment will be described with reference to FIG. 7. As shown in FIG. 7, the fourth embodiment is different from the above-described embodiments in that an end portion 55 having a step part 53 in a linear shape is included. The end portion 55 has an optical surface S1 located between a pair of step parts 53, a pair of step parts 53 extending in the direction D3 on the two end sides of the optical surface S1 in the direction D2, and guide hole exposure surfaces S6 individually located on the two end sides of the pair of step parts 53 in the direction D2. Similarly to the above-described step part 43, the step part 53 is a projection protruding to the optical surface S1, and is a film adhered to the ferrule 50, for example.

The ferrule 50 according to the fourth embodiment includes the end portion 55 formed with the guide hole exposure surface S6 and the step part 53, and the step part 53 suppresses the entry of dust from the guide hole exposure surface S6 into the optical surface S1. Similarly to the third embodiment, the projection (the step part 53) is formed between the guide hole exposure surface S6 and the optical surface S1, and thus obtaining the operation and effect similar to the description above is enabled.

Fifth Embodiment

Figure 8:
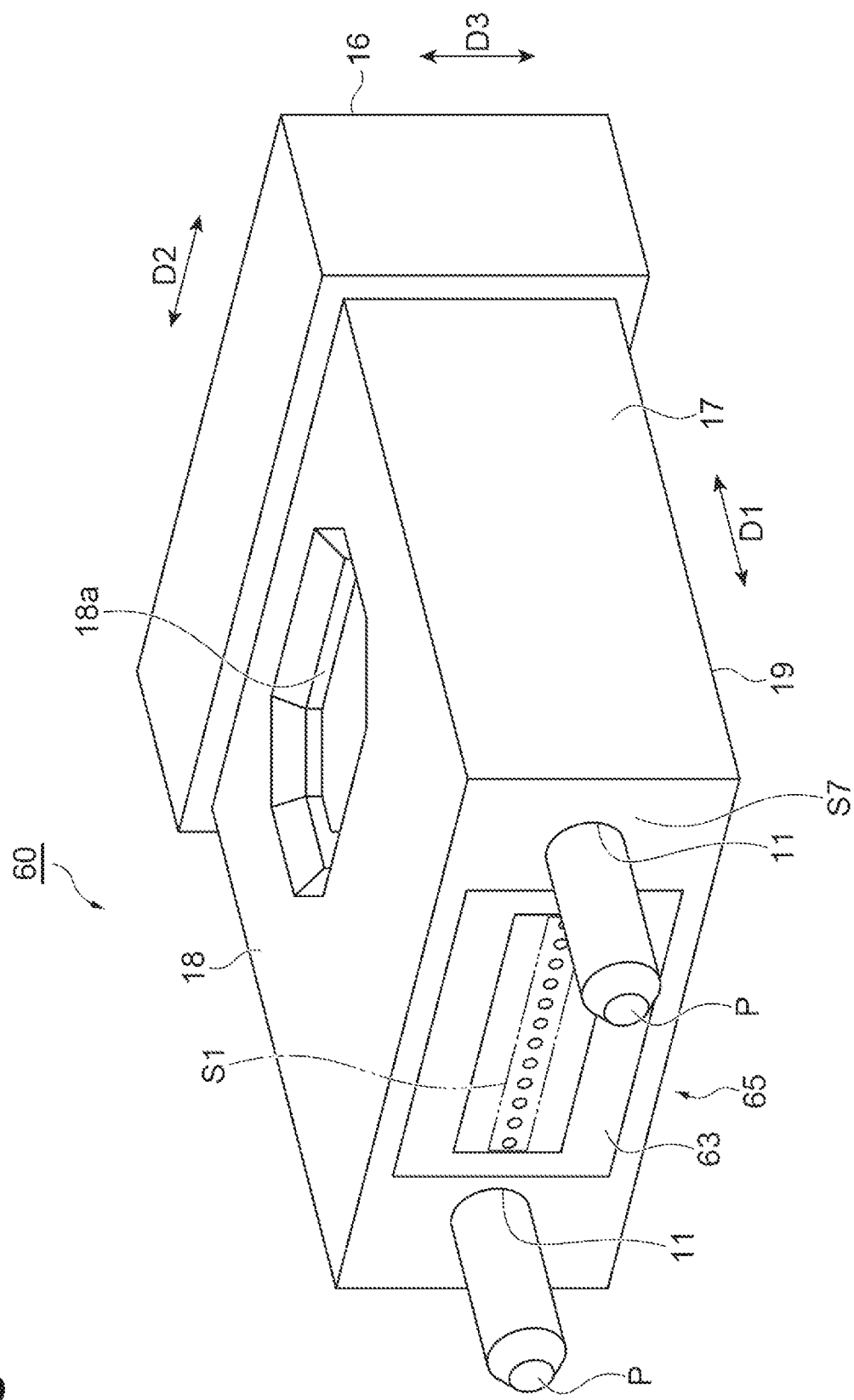
FIG. 8 is a perspective view showing a ferrule and guide pins according to a fifth embodiment.

Next, a ferrule 60 according to a fifth embodiment will be described with reference to FIG. 8. As shown in FIG. 8, the fifth embodiment is different from the above-described embodiments in that an end portion 65 having a step part 63 in a frame shape is included. The end portion 65 has an optical surface S1 in a rectangular shape, a step part 63 in a rectangular frame shape, and a guide hole exposure surface S7 located on the outer side of the optical surface S1 viewed from the step part 63.

Similarly to the description above, the step part 63 may be a film adhered to the ferrule 60. The step part 63 is a projection protruding in the connection direction D1 to the optical surface S1. As described above, the ferrule 60 according to the fifth embodiment includes the end portion 65 having the guide hole exposure surface S7 and the step part 63 formed on the outer side of the optical surface S1, and the step part 63 suppresses the entry of dust from the guide hole exposure surface S7 into the optical surface S1. Accordingly, the effects similar to the above-described embodiments are obtained.

As described above, the embodiments of the ferrules and the optical connectors according to the present disclosure. However, the present invention is not limited to the contents of the forgoing embodiments, and various modifications are possible within the scope not deviating from the gist described in claims. That is, the shapes, sizes, materials, numbers, and disposition forms of the components of the ferrules and the optical connectors are appropriately changeable within the range not chaining the gist.

For example, in the foregoing third to the fifth embodiments, examples of forming the step parts 43, 53, and 63 that are projections suppressing the entry of dust into the optical surface S1 using a film adhered, i.e., adhesion are described. However, schemes of forming the step part is not limited to adhesion, and the schemes are appropriately changeable.

Figure 9:
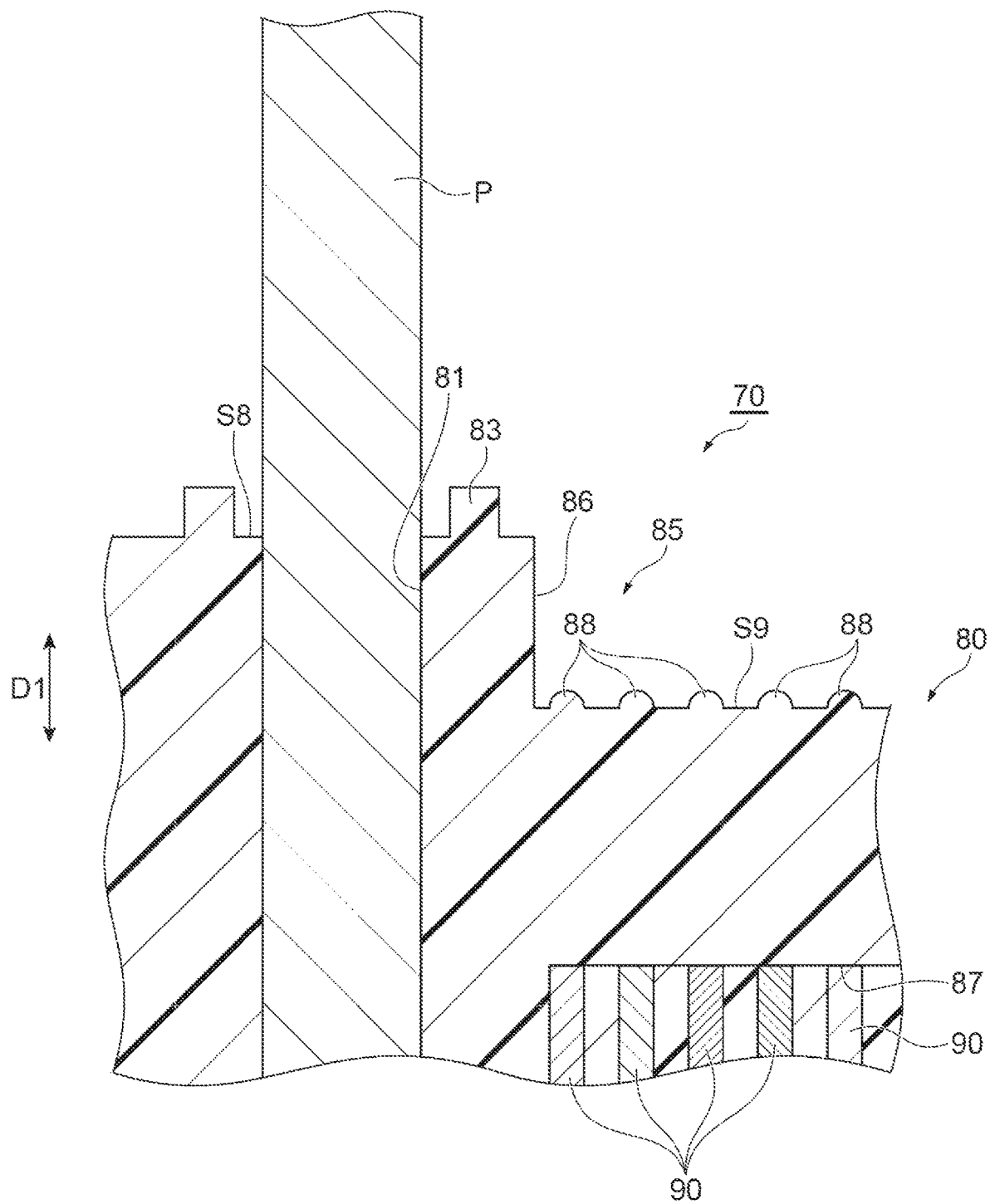
FIG. 9 is a long-side sectional view showing a ferrule and a guide pin according to an exemplary modification.

For example, like an optical connector 70 and a ferrule 80 of an exemplary modification shown in FIG. 9, a step part 83 in a projection shape integrally molded by resin molding may be included. In this case, omission of the process of forming a projection by post processing is enabled. The ferrule 80 has a guide hole exposure surface S8 including the opening of a guide hole 81, the step part 83 that is a projection protruding from the guide hole exposure surface S8, and an optical surface S9 recessed in the connection direction D1 from the step part 83.

That is, an end portion 85 of the ferrule 80 has a recess 86 recessed in the connection direction D1 to the guide hole exposure surface S8, and the bottom surface of the recess 86 is the optical surface S9. The optical surface S9 is formed with a plurality of convex lenses 88 to which a plurality of optical fibers 90 is individually optically coupled, the plurality of optical fibers 90 being abutted on a wall surface 87 in the inside of the ferrule 80. The optical connector 70 is a lens connector having plurality of convex lenses 88 on the bottom surface of the recess 86 of the ferrule 80. For example, from the individual optical fibers 90, a diverging ray is emitted, and the diverging ray is converted into collimated light by the convex lens 88. The convex lens 88 located on the bottom surface of the recess 86 is not brought into a counterpart connector C in connection of the counterpart connector C to the optical connector 70, and thus the spatial join of the optical connector 70 to the counterpart connector C is achieved.

Even in the optical connector 70 and the ferrule 80 described above, the step part 83 is formed between the guide hole exposure surface S8 and the optical surface S9, and thus the effects similar to the above-described embodiments are obtained. Moreover, in the optical connector 70 and the ferrule 80, the convex lens 88 is formed on the optical surface S9 that is the bottom surface of the recess 86, and thus the optical surface S9, for example, does not have to be polished. Accordingly, even though the step part 83 is formed by integral molding of a resin, the avoidance of peeling off of the step part 83 by polishing is enabled.

In the foregoing embodiments, the guide hole exposure surface S2 in an annular ring shape in a concentric circle with the guide pin P is described. However, the shape of the guide hole exposure surface S2 viewed from the connection direction D1 may be in a polygonal shape, such as a linear shape, a triangular shape, or a rectangular shape, or in an oblong shape, which is appropriately changeable.

In the foregoing embodiments, the 12-core ferrule having 12 optical fiber retention holes 12 arranged along the direction D2 is described. However, the numbers of cores of the ferrule and the optical connector may be 16 cores, 24 cores (12 cores×a parallel array) or 32 cores (16 cores×a parallel array), for example, which are appropriately changeable.

REFERENCE SIGNS LIST

1, 70 optical connector
10, 30, 40, 50, 60, 80 ferrule
11, 81 guide hole
12 optical fiber retention hole
13, 33, 43, 53, 63, 83 step part
15, 35, 45, 55, 65, 85 end portion
16 rear end portion
17 side portion
18 upper portion
18a window hole
19 lower portion
20, 90 optical fiber
21 tip end face
86 recess
87 wall surface
88 convex lens
B width
C counterpart connector
D diameter
D1 connection direction
D2 direction
D3 direction
P guide pin
S1, S9 optical surface
S2, S4, S5, S6, S7, S8 guide hole exposure surface
S3 contact surface.

The invention claimed is:

1. A ferrule of an optical connector to which a counterpart connector is connected, the ferrule comprising
an end portion having an optical fiber retention hole and a guide hole opened from the end portion, the optical fiber retention hole into and on which an optical fiber being inserted into and retained on the optical fiber retention hole, a guide pin being inserted into the guide hole, and the guide pin establishing positioning to the counterpart connector, wherein
the end portion includes
an optical surface including an opening of the optical fiber retention hole,
a guide hole exposure surface including an opening of the guide hole, and
a step part formed between the optical surface and the guide hole exposure surface, the step part being a projection protruding from the guide hole exposure surface in a height direction, and
a height of the guide hole exposure surface and a height of the optical surface are the same relative to the height direction.

2. An optical connector comprising:
the ferrule according to claim 1; and
an optical fiber inserted into and retained on the optical fiber retention hole of the ferrule.

* * * * *